J. C. BIRDSELL.

Clover Thrasher and Huller.

No. 2,797. Reissued Nov. 12, 1867.

Witnesses

Wm Tusch

J. W. Coombs

Inventor

John C Birdsell

N. PETERS, Photo-Lithographer, Washington, D. C.

United States Patent Office.

JOHN C. BIRDSELL, OF SOUTH BEND, INDIANA.

*Letters Patent No.* 26,409, *dated December* 13, 1859; *reissue No.* 2,797, *dated November* 12, 1867.

IMPROVED MACHINE FOR BOLTING AND CLEANING CLOVER-SEED.

The Schedule referred to in these Letters Patent and making part of the same.

TO ALL WHOM IT MAY CONCERN:

Be it known that I, JOHN C. BIRDSELL, formerly of West Henrietta, in the county of Monroe, and State of New York, and now of South Bend, in the State of Indiana, have invented certain new and useful Improvements in Machines for Bolting and Cleaning Clover-Seed; and I do hereby declare that the following is a full, clear, and exact description of the same, reference being had to the accompanying drawings, making a part of this specification, and to the letters of reference marked thereon, in which—

Similar letters of reference, where they occur in the separate figures, denote like parts of the machine in all the drawings.

Figure 1:
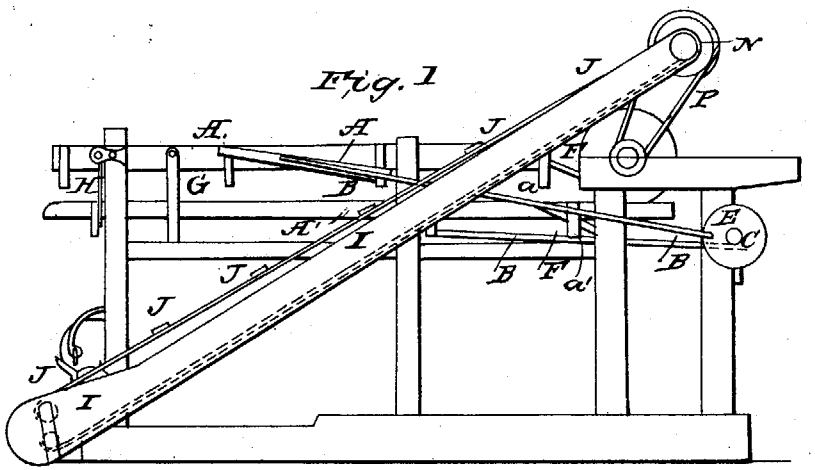
Figure 1 represents a side elevation of the machine, exhibiting only the bolting and conveying mechanism.
Figure 4:
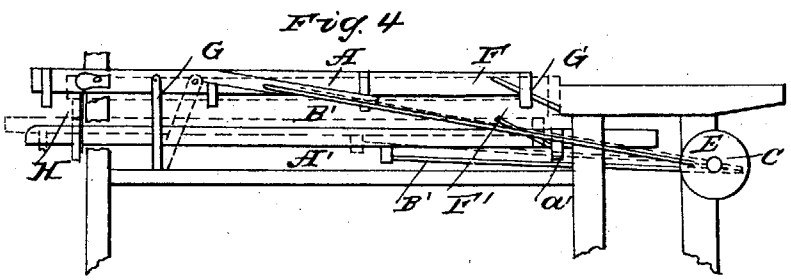
Figure 4 represents the bolts in two positions, and a part of the frame of the machine.
Figure 3:
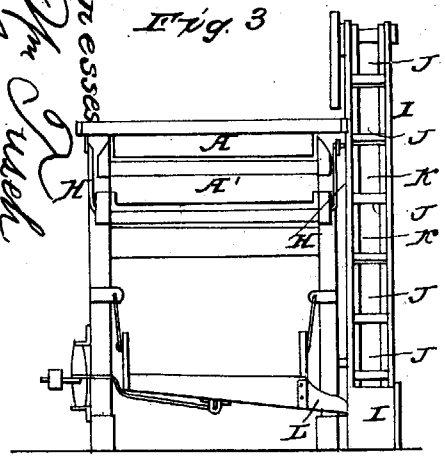
Figure 3 represents the end of the machine opposite that shown at fig. 2.
Figure 2:
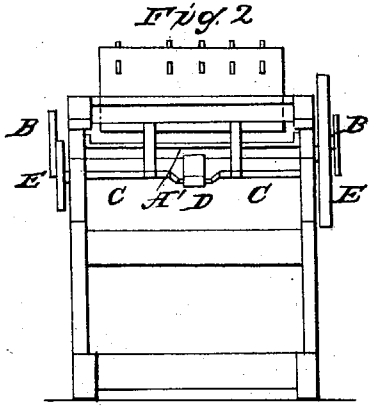
Figure 2 represents an end view of the same.

The nature of my invention consists in arranging two bolts or screens in a clover machine, in such a manner that they shall have, when in operation, an oblique reciprocal counter or alternating motion, so that they will reciprocally rise with a forward motion and fall with a backward motion, for the purpose of more effectually separating the cups or bowls containing the clover-seed from the straw by the forward upward motion and the backward downward motion of the bolts or screens, while, at the same time, the straw is propelled to the rear of the machine.

And my invention further consists in providing an endless conveyer, so arranged that it will convey the tailings, which have not been effectually threshed or hulled, back to be again submitted to the process of hulling.

To enable others skilled in the art to make and use my invention, I will proceed to describe the same with reference to the drawings, first premising that, as the present claims will only relate to the devices for bolting and conveying, it is unnecessary to exhibit the entire machine in the drawings, but only the several parts herein referred to.

A A′ represent the two bolts, which are placed one over the other, and are operated by means of connecting-rods, B and B′, which are attached to a crank-shaft, C. The rod B′ being attached to the crank D on said shaft C, and connecting with the lower bolt A′, gives motion to said lower bolt. The rods B B connect with the cranks E E on each side of the machine, but on the opposite side of the shaft C to the crank D, thus giving a double crank motion to the connecting-rods B B and B′. These rods B B pass along one on each side of the machine, and are attached to the side of the upper bolt A, and give motion to it. F F are inclined guides, fixed in the frame of the machine, on which the cross-ties *a a* on each side of the bolts rest and slide, and by means of which the bolts are guided in their motion. G G are arms, (one of which only is shown in the drawing, but both alike and on opposite sides of the bolts,) the ends of which are pivoted respectively to the frame of the machine and to the upper bolt A, and upon which said bolt rests. H H are arms, the ends of which respectively are pivoted to the frame of the machine and to the lower bolt A′, at or near its end, and upon these arms said lower bolt rests. And by the above-described arrangement of bolts, cranks, connecting-rods, guides, and arms is accomplished the object above specified.

In order to submit the tailings of unthreshed or unhulled seed again to the operation of threshing and hulling, or either, I arrange a trough, I, provided with conveyers, J, attached to the endless band K. This trough I receives the tailings, &c., from the sieves through a spout, from whence they are taken by the conveyers J and carried up to any convenient place of deposit, to be again submitted to the thresher, huller, and fans, or any or either of them.

The conveyers are operated by a pulley, N, and band, P, which is attached to the threshing-cylinder shaft, or any other convenient pulley or shaft to give it motion.

What I claim as my invention, is—

1. The combination, in a machine for threshing and hulling clover-seed, of the bolts A A′, with the cranks D E E, guide-rods F F, arms G G H H, and connecting-rods B B′, or their equivalents, in the manner and for the purposes set forth.

2. I claim the combination, in the machine above described, for threshing and hulling clover-seed, the trough I, with the endless conveyer J, in the manner and for the purposes specified.

JOHN C. BIRDSELL.

Witnesses:

A. B. STOUGHTON,

EDM. F. BROWN.